[12] United States Patent
Ziskovsky et al.

(10) Patent No.: US 10,400,882 B2
(45) Date of Patent: Sep. 3, 2019

(54) PRODUCT AND METHOD OF ASSEMBLING MULTIPLE COMPONENTS USING A PRESS FIT

(71) Applicant: Deere & Company, Moline, IL (US)

(72) Inventors: Darren J. Ziskovsky, Dubuque, IA (US); Jeffrey S. Turner, Coffeyville, KS (US); Austin B. Stephens, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/787,131

(22) Filed: Oct. 18, 2017

(65) Prior Publication Data

US 2019/0113124 A1    Apr. 18, 2019

(51) Int. Cl.
*F16H 57/02*    (2012.01)
*F16H 57/08*    (2006.01)
(Continued)

(52) U.S. Cl.
CPC ......... *F16H 57/022* (2013.01); *F16C 19/364* (2013.01); *F16C 19/385* (2013.01); *F16C 33/7813* (2013.01); *F16C 35/06* (2013.01); *F16H 57/0025* (2013.01); *F16H 57/08* (2013.01); *F16C 2229/00* (2013.01);
(Continued)

(58) Field of Classification Search
CPC .. F16C 19/364; F16C 19/385; F16C 33/7813; F16C 35/06; F16C 2240/14; F16C 2229/00; F16H 57/022; F16H 57/0025; F16H 57/08; F16H 2057/0027; F16H 2057/085; Y10T 403/7047

USPC ....... 384/490, 504, 510, 559, 563, 571, 540, 384/586, 537, 543, 548; 29/898.062, 898, 29/7, 898.09; 403/359.6, 365
See application file for complete search history.

(56) References Cited

U.S. PATENT DOCUMENTS 3,167,364 A * 1/1965 Dunn ...................... F16C 25/06
                                                    384/510
3,836,272 A * 9/1974 Duer ........................ F16D 1/09
                                                    403/359.5
(Continued)

FOREIGN PATENT DOCUMENTS

CN        201144791 Y  * 11/2008  .............. F04B 53/00
DE    102018111749 A1    12/2018
(Continued)

OTHER PUBLICATIONS

German Search Report for application No. 102018215858 dated May 15, 2019.

*Primary Examiner* — Marcus Charles
(74) *Attorney, Agent, or Firm* — Klintworth & Rozenblat IP LLP

(57) ABSTRACT

A product and method for assembling multiple components using an interference fit. An assembled product includes a first component, with a second component configured to mate with the first component so that the second component is removable from the first component for a positional adjustment. A third component is configured to mate with the first component and to be engaged therewith by a first interference fit. The first interference fit is configured to impart a resultant reaction in the first component that creates a second interference fit between the first and second components.

16 Claims, 4 Drawing Sheets

(51) Int. Cl.
  *F16C 19/36* (2006.01)
  *F16C 19/38* (2006.01)
  *F16C 35/06* (2006.01)
  *F16H 57/022* (2012.01)
  *F16H 57/00* (2012.01)
  *F16C 33/78* (2006.01)

(52) U.S. Cl.
  CPC .. *F16C 2240/14* (2013.01); *F16H 2057/0227* (2013.01); *F16H 2057/085* (2013.01); *Y10T 403/7047* (2015.01)

(56) References Cited

U.S. PATENT DOCUMENTS

| | | | | | |
|---|---|---|---|---|---|
| 5,121,998 | A | * | 6/1992 | Bhatia | F16C 19/386 384/448 |
| 5,125,156 | A | * | 6/1992 | Witte | B25B 23/14 29/407.03 |
| 5,624,192 | A | * | 4/1997 | Rigaux | F16C 33/60 324/174 |
| 5,713,719 | A | * | 2/1998 | Fiore | F04D 29/426 415/111 |
| 5,992,943 | A | * | 11/1999 | Sheets | B60B 27/001 29/898.062 |
| 6,062,737 | A | * | 5/2000 | Thienes | B60B 27/00 384/562 |
| 6,530,859 | B2 | | 3/2003 | Boston et al. | |
| 9,062,711 | B2 | * | 6/2015 | Hofmann | F16C 19/542 |
| 2003/0032521 | A1 | * | 2/2003 | Boston | F16C 21/00 475/331 |
| 2005/0248103 | A1 | | 11/2005 | Kramer | |
| 2006/0084549 | A1 | | 4/2006 | Smithson et al. | |
| 2008/0247699 | A1 | * | 10/2008 | Braun | F16C 19/54 384/504 |
| 2016/0281834 | A1 | * | 9/2016 | Campbell | F16C 33/6666 |
| 2017/0120674 | A1 | * | 5/2017 | White | B60B 27/02 |

FOREIGN PATENT DOCUMENTS

| | | | | |
|---|---|---|---|---|
| GB | 885899 | A * | 1/1962 | F16C 19/388 |
| GB | 2537240 | A * | 10/2016 | F16H 57/0479 |
| JP | 2002227853 | A * | 8/2002 | F16C 33/78 |
| WO | WO-0220284 | A2 * | 3/2002 | F16C 19/364 |

* cited by examiner

PRODUCT AND METHOD OF ASSEMBLING MULTIPLE COMPONENTS USING A PRESS FIT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to component assembly, and to assemblies where the resultant reaction of a component from a press fit is used for retaining other components.

BACKGROUND OF THE DISCLOSURE

Various work vehicle and machine applications include components that are assembled with predefined settings such as an axial interference/preload, an axial clearance/endplay, a radial clearance, a clamp load, a slip fit, etc. Example applications include power take-off assemblies, wheel assemblies, speed reducers or multipliers, torque hub units, motors, transmissions, axle assemblies, pumps, compressors, and other applications with rotating, cycling, or translating parts. Achieving the desired predefined setting may involve repeated assembly and disassembly to make positional adjustments. When the components are retained by an interference fit or through deformation, disassembly may be difficult, parts may be damaged, and interface areas may be degraded through repeated assembly. Accordingly, improvements that facilitate assembly would be beneficial.

SUMMARY OF THE DISCLOSURE

The disclosure provides a product and method for assembling multiple components using an interference fit.

In one aspect, an assembled product includes a first component, with a second component configured to mate with the first component so that the second component is removable from the first component for a positional adjustment. A third component is configured to mate with the first component and to be engaged therewith by a first interference fit. The first interference fit is configured to impart a resultant reaction in the first component that creates a second interference fit between the first and second components.

In some aspects the second component is a bearing and its position is adjusted to result in a desired preload on the bearing.

In another aspect, a method of assembling multiple components includes mating a first component with a second component so that the second component is removable from the first component. A third component is mated with the first component, engaging the first and third components together by a first interference fit. The first interference fit imparts a resultant reaction in the first component creating a second interference fit between the first and second components.

In an additional aspect, a method of assembling multiple components includes mating a first component with a second component so that the second component is removable from the first component. The position of the second component is then measured. When the measured position is not within a defined positional setting, the second component is removed from the first component and the position of the second component is adjusted. A third component is mated with the first component engaging the first and third components together by a first interference fit. The first interference fit imparts a resultant reaction in the first component creating a second interference fit between the first and second components.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a disclosed assembled product and method, as shown in the accompanying figures of the drawings described briefly above. Various modifications to the example embodiments may be contemplated by one of skill in the art.

Generally, in one or more example implementations of the disclosed product and method for assembling multiple components, an interference fit between two of the components is used to impart an interference fit between additional components. In a disclosed embodiment, the product and method facilitates setting the distance between bearing assemblies. The product and method may be applied to assemblies to achieve predefined settings such as an axial interference/preload, an axial clearance/endplay, a radial clearance, a clamp load, a slip fit, and others.

The following description relates to a product and method that may be described in the context of a final drive application with tapered roller bearings, for purposes of demonstrating an example. The final drive is used in a compact track loader. In a final drive, tapered roller bearing application, one objective is to achieve a desired axial spacing setting between two bearing assemblies. The present disclosure is not limited to final drives or to roller bearing applications, but rather, also encompasses assembly applications where providing a particular setting for rotating, cycling, or translating components is required. Accordingly, the teachings of the present disclosure can be applied to assemblies in a variety of applications, including those with tapered roller bearings, when desired.

In an example of the present disclosure as further described below, an assembled product includes a first component that in the disclosed embodiment is a carrier of a planetary gear set, and includes a second component that in the disclosed example is a bearing assembly. The bearing assembly is configured to removably mate with the carrier. The bearing assembly may be added to the assembly with the carrier and may then be removed for a number of reasons, for example to make a positional adjustment. A third component that in the disclosed example is a spindle, is configured to mate with the carrier and to be engaged therewith by a forced interference fit such as a press fit. The carrier is an intermediary that "reacts," in-that the interference fit initiated by addition of the spindle causes a reaction, such as imparting a resultant growth in the carrier, that creates a second interference fit between the carrier and the bearing assembly. Accordingly, the bearing assembly is assembled with a slip fit until the spindle is added to the assembly causing a reaction that creates an interference fit between the carrier and bearing assembly.

Figure 1:
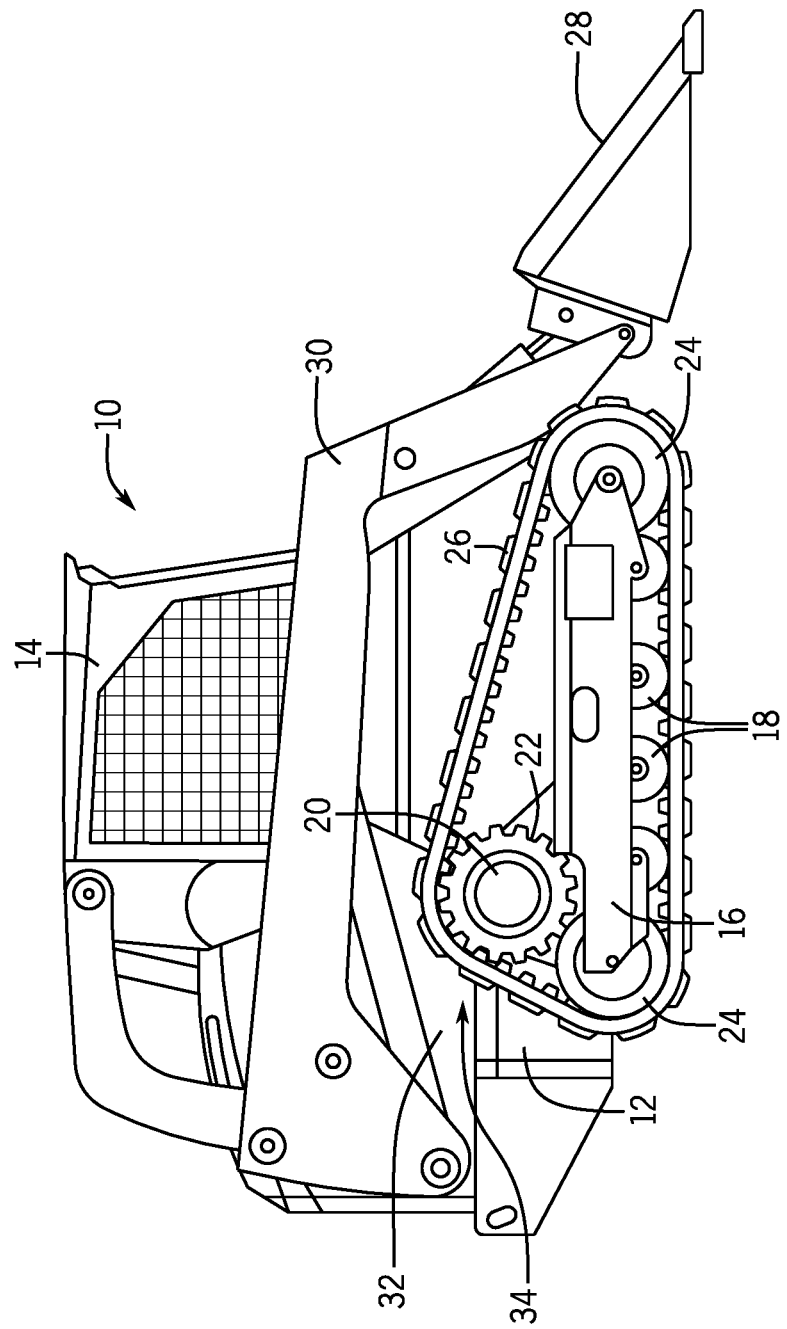
FIG. 1 is a side view of an example compact track loader.

FIG. 1 is a side view of a compact track loader 10, illustrated as an example work vehicle application of the present disclosure. The compact track loader 10 includes a chassis 12, with a cabin 14 supported by the chassis 12 and configured to house an operator. The compact track loader 10 further includes a tracked undercarriage 16 that includes lower track rollers 18, a final drive 20 with a drive sprocket 22, idlers 24, and a track 26. The final drive 20 uses the drive sprocket 22 to drive the track 26 to circulate around the lower track rollers 18 and idlers 24. It will be understood that the opposite side of the compact track loader 10 includes a similar undercarriage. In other embodiments, the tracked undercarriage 16 may be replaced by a different type of undercarriage, such as one including wheels, friction or positively-driven belts, or another ground-engaging mechanism suitable for moving the compact track loader 10 across a surface, such as off-road terrain. The compact track loader 10 further includes a loader bucket 28 mounted toward a forward portion of the chassis 12 by a control linkage 30, which is constructed of various links, joints, and other structural elements to elevate and tilt the loader bucket 28. The compact track loader 10 is powered by an engine 32, coupled with a hydraulic system 34 for delivering fluid pressure and flow through the final drive 20 to the drive sprocket 22 to generate drive torque.

In the current example, the final drive 20 includes a hydraulic motor configured with variable speed control. Transfer of power from the engine 32 to the track 26 is accomplished by the drive sprocket 22, which is driven by the final drive 20 and which is engaging with receivers in the track 26. The final drive 20 is powered by the engine 32 through the hydraulic system 34. The final drive 20 includes a number of internal components such as gears, shafts, torque transmission elements, clutches, and others, many of which have tight tolerance requirements leading to a complicated assembly. Accordingly, the current disclosure addresses approaches that facilitating certain aspects of that assembly. As such, the disclosure describes the assembly of multiple components within example applications, including that of the final drive 20 of the compact track loader 10. However, the assembled products and methods described herein are not limited to compact track loaders, final drives, or to any specific machine or unit, but are generally applicable to assembled products where providing a particular positional setting for rotating, cycling, or translating components is required.

Figure 2:
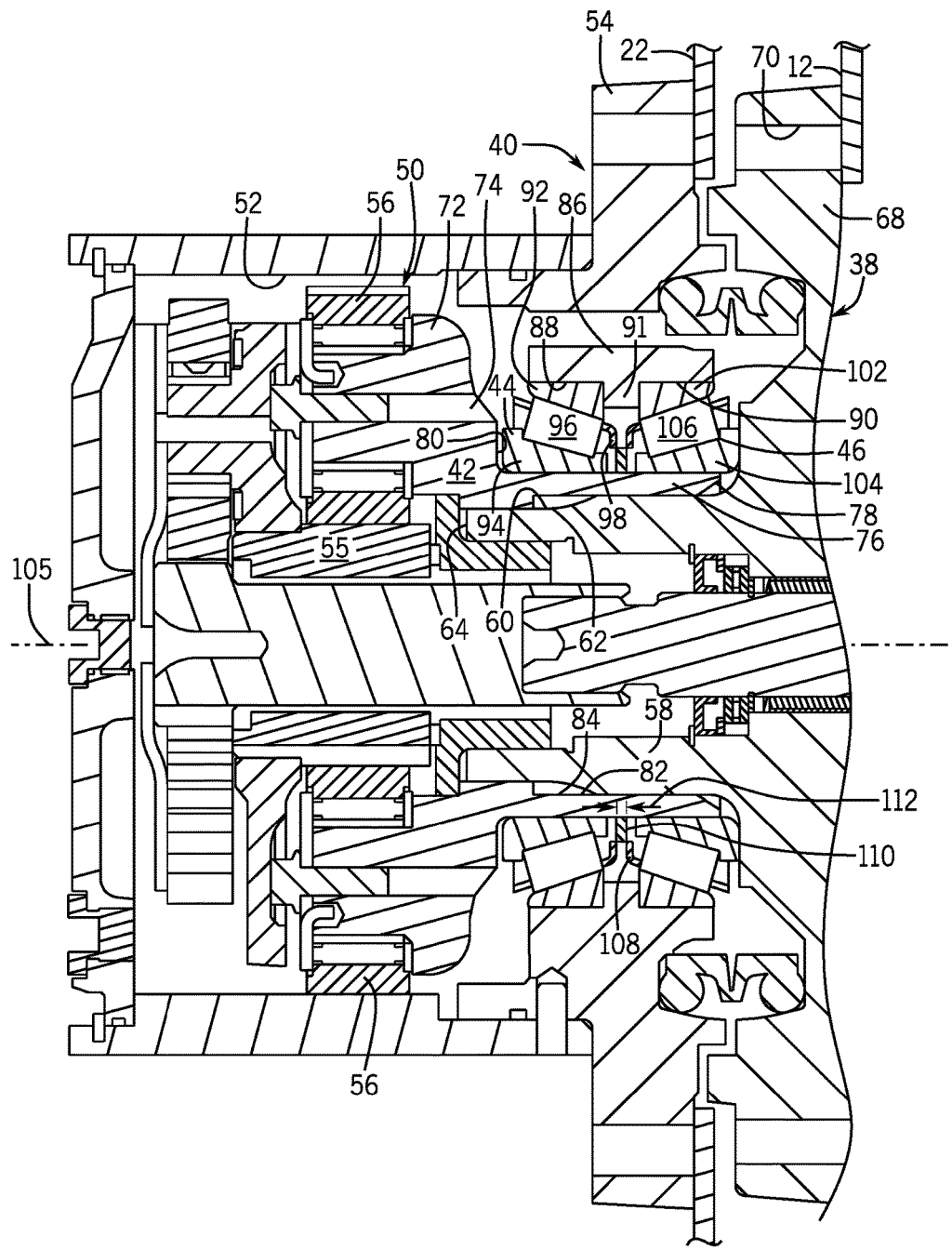
FIG. 2 is a partial cross-sectional view of a bearing area of an example final drive assembly for the compact track loader of FIG. 1

As noted above, the assembled product and method described herein may be employed in a variety of applications. Referring to FIG. 2, the current example involves the final drive 20 as an assembly. The part of the final drive 20 shown includes a number of components illustrated in detail for purposes of the current description. One component is a spindle 38 supporting an output housing 40 through another component in the form of a carrier 42. Additional components in the form of bearing assemblies 44, 46 support the output housing 40 to rotate relative to the carrier 42. In this example, the bearing assemblies 44, 46 include tapered roller bearings. The spindle 38 is fixed to the chassis 12 of the compact track loader 10, whereas the output housing 40 is rotatable and is coupled with the drive sprocket 22 for driving the track 26. The carrier 42 is part of a planetary gear set 50. A ring gear 52 of the planetary gear set 50 forms a part of the output housing 40 and in this example, is a separate piece connected with an output flange 54 of the output housing 40. The planetary gear set 50 includes a sun gear 55 and includes planet gears 56 mounted on the carrier 42. The planet gears 56 mesh with the sun gear 55 and the ring gear 52. It will be apparent that the planetary gear set 50 is configured to drive the ring gear 52 to rotate and along with it the output flange 54 and the drive sprocket 22 to propel the track 26.

The spindle 38 includes a shaft 58 in the form of a hollow cylindrical extension. The shaft 58 has an outer surface 60 that includes a splined section 62 adjacent the terminal end 64 of the shaft 58. The spindle 38 also includes a mounting flange 68 that is disk shaped and has a number of openings 70 for attaching the spindle 38 to the chassis 12, such as through bolts (not shown). The shaft 58 projects from the mounting flange 68 to its terminal end 64. The carrier 42 includes a body 72 that is annular in shape and that includes a number of openings 74 for mounting the planet gears 56 of the planetary gear set 50. An extension 76 projects from the body 72 to a terminal end 78. The extension 76 is formed in the shape of a hollow cylinder with a shoulder 80 formed at a juncture of the body 72 and the extension 76. The extension 76 includes an inner surface 82 that includes a splined section 84 that mates with the splined section 62 of the spindle 38. When the shaft 58 of the spindle 38 is inserted into the extension 76, the splined sections 62, 84 mate, engaging one another with an interference fit, and the carrier 42 is held from rotating by the spindle 38.

The output housing 40 includes a support section 86 projecting inward from the output flange 54 forming a pair of pockets 88, 90 separated by a spacer 91 that projects inward between the pockets 88, 90 and which is annular in shape. In this example, the spacer 91 is an integral part of the output housing 40. The bearing assemblies 44, 46 are contained between the support section 86 of the output housing 40 and the extension 76 of the carrier 42. With the spindle 38 mounted to the chassis 12, the bearing assembly 44 is located outboard from the bearing assembly 46 on the compact track loader 10. The bearing assembly 44 includes a bearing cup 92 that is positioned in the pocket 88 and a bearing cone 94 with rollers 96, positioned on the extension 76. A number of rollers 96 sufficient to surround the circumference of the bearing cone 94 are included and are retained on the bearing cone 94 by a cage 98. The rollers 96 roll between the bearing cone 94 and the bearing cup 92 and rotationally support the output housing 40 and the drive sprocket 22 on the carrier 42 and there-through, on the spindle 38. Similarly, the bearing assembly 46 includes a bearing cup 102 that is positioned in the pocket 90 and a bearing cone 104 with rollers 106, positioned on the extension 76. A number of rollers 106 sufficient to surround the circumference of the bearing cone 104 are included and are retained on the bearing cone 104 by a cage 108. The rollers 106 roll between the bearing cone 104 and the bearing cup 102 and also rotationally support the output housing 40 and the drive sprocket 22 on the carrier 42 and there-through, on the spindle 38. The rollers 96, 106 are tapered and are disposed at angles relative to the axis of rotation 105 so that the rollers 96, 106 are inclined toward each other.

A positional setting of the bearing assemblies 44, 46 relative to one another determines the amount of endplay that may exist between the spindle 38 and the drive sprocket 22 and/or the amount of preload that is applied to the bearing assemblies 44, 46. Generally, increasing the distance that the bearing cones 94, 104 are spaced apart increases endplay (or decreases preload), and decreasing the distance that the bearing cones 94, 104 are spaced apart increases preload (or decreases endplay). This is due to the orientation of the rollers 96, 106 at the angles as mentioned above. In the current example, endplay is not desired but instead the bearing assemblies are preloaded. Accordingly, the positional setting of the bearing cone 94 relative to the other bearing cone 104 is set so that the rollers 96 are compressed between the bearing cup 92 and the bearing cone 94 and the rollers 106 are compressed between the bearing cup 102 and the bearing cones 104. The objective of the preload is to place all of the rollers 96, 106 into contact with their respective bearing cup 92, 102 and with their respective bearing cone 94, 104 to distribute the load among the rollers 96, 106. At the same time, an excessive preload is not desired. Within these constraints, the positional setting of the bearings is checked at the time of assembly and adjusted when necessary prior to finalizing original assembly. The process may also be repeated at a later time during maintenance.

Figure 3:
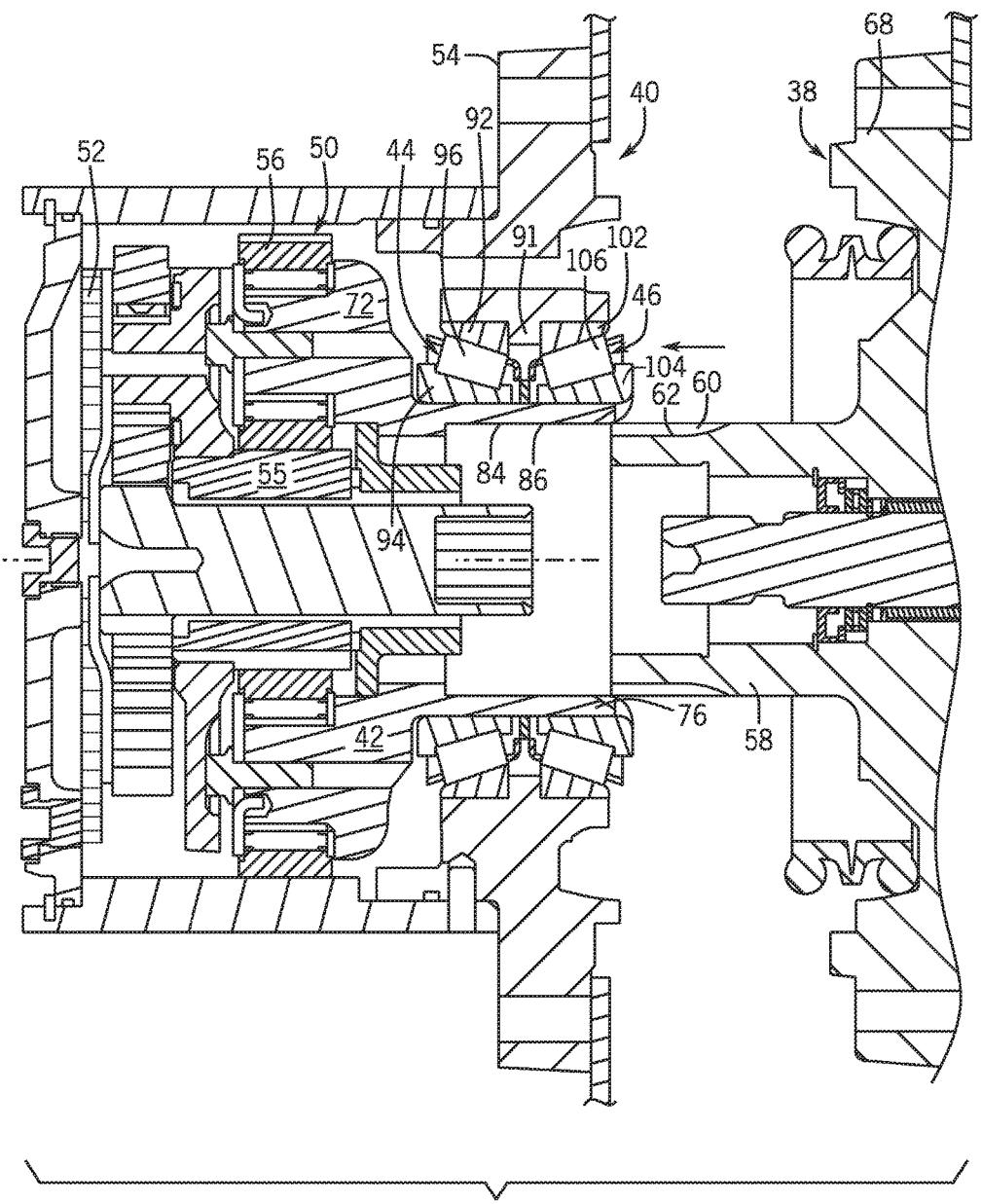
FIG. 3 is another partial cross-sectional view thereof showing the spindle prior to engagement with the carrier.

With reference to FIG. 3, the position of the bearing assembly 46 is checked and adjusted prior to insertion of the shaft 58 into the carrier 42. At this stage, the bearing assembly 46 has a slip fit over the extension 76 and may be readily removed and it position adjusted. In the current example, achieving the positional setting is determined by a shim 110 (or a shim set), that is positioned between the bearing cones 94, 104 and on the extension 76. It should be understood that due to variation within the tolerances of the individual components, width 112 of the shim 110 that provides the desired positional setting varies among individual assemblies. In other examples, shimming may involve actions other than adding or removing a shim. For example, shimming may include adding or removing material from a component, using threads to adjust position, using screws or devices that expand and contract to adjust spacing, or using other types of spacing mechanisms.

Figure 4:
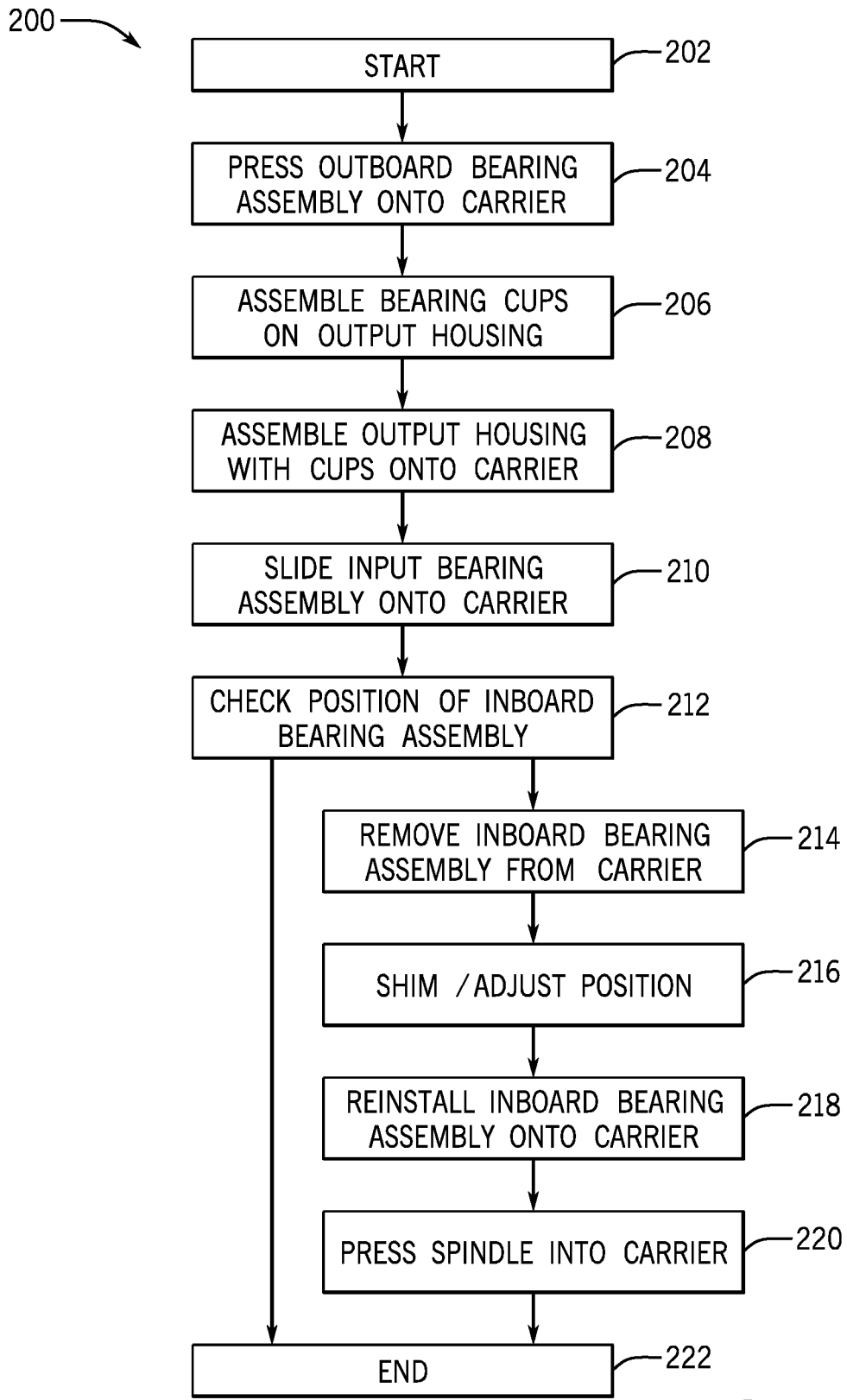
FIG. 4 is a flow chart of a method of utilizing the reaction from a press fit for retaining multiple components.

Referring to FIG. 4, a process 200 of assembling multiple components starts 202 when assembly of a product is undertaken. In the current example, a first component in the form of the carrier 42 is procured. At step 204 another component in the form of the bearing assembly 44 is pressed onto the extension 76 of the carrier 42 as shown in FIG. 2. As a result, the bearing cone 94 is positioned against the shoulder 80. An interference fit between the bearing cone 94 and the extension 76 holds the bearing assembly 44 in position against the shoulder 80. Proceeding to step 206, the bearing cups 92, 102 are assembled onto the output housing 40 in the pockets 88, 90 respectively. It should be apparent that the order of steps 204 and 206 may be reversed. At step 208, the output housing 40 with bearing cups 92, 102 is assembled to the carrier 42 with the bearing assembly 44 so that the rollers 96 contact the bearing cup 92 and the bearing cone 94. At step 210, the bearing assembly 46 is slid onto the extension 76 of the carrier 42 so that the rollers 106 contact the bearing cup 102 and the bearing cone 104. At step 210 a slip fit is provided between the bearing cone 94 and the extension 76 so that the bearing assembly 46 is removably positioned on the carrier 42.

With both bearing assemblies 44, 46 positioned on the extension 76 of the carrier 42, the position of the bearing assembly 46 relative to the bearing assembly 44 may be checked at step 212. This is done prior to addition of the spindle 38 to the assembly as shown in FIG. 3. It should be noted that at step 212, the space between the bearing cones 94, 104 may contain an initial shim 110 (or a number of shims). In other examples, the space between the bearing cones 94, 104 may be open without the shim 110. A fixture (not shown) may be used to hold the carrier 42 in position relative to the output housing 40. A gage (not shown) is used to measure, or otherwise check the position of the bearing cone 104 relative to the bearing cone 94. The gage may be constructed to quickly identify the shim 110 (or shim pack), that will result in the desired preload or endplay when the product is completely assembled. When the positional check determines that adjustment of the bearing assembly 46 is needed, the process 200 proceeds to step 214. When the positional check determines that the bearing assembly 46 is within an acceptable position range, the process 200 ends 222.

In the case of proceeding to step 214, the bearing assembly 46 is removed from the extension 76 of the carrier 42. In this example, the bearing assembly 46 may alternatively be referred to descriptively as the removeable component. At step 216, the shim 110 (or shim pack), identified in step 212 is slid onto the extension 76 of the carrier 42 and is positioned against the bearing cone 94. In other examples where an initial shim 110 (or shim pack) was in position and the spacing needs to be reduced, a shim or shims may be removed as identified at step 212. At step 218, the bearing assembly 46 is again slid onto the extension 76 of the carrier 42 with a positional adjustment imparted as a result of the identified shim(s) 110. Proceeding to step 220, the spindle 38 is added to the assembly with the shaft 58 pressed into the extension 76. The splined section 62 of the spindle 38 mates with the splined section 84 of the carrier 42 and an interference fit between the spindle 38 and the carrier 42 is developed. In addition, the interference fit between the spindle 38 and the carrier 42 forces the extension 76 to react by expanding/growing, causing an interference fit between the extension 76 and the bearing cone 104. As a result, the bearing cone 104 is locked in position on the outer surface 60. Accordingly, the interference fit between the spindle 38 and the carrier 42 is configured to impart a resultant growth in the carrier 42 that creates an interference fit between the carrier 42 and the bearing assembly 46, and the process 200 ends at step 222. In this example, the spindle 38 may be referred to descriptively as the forcing component, and the carrier 42 may alternatively be referred to descriptively as the reacting component. It should be understood that the spindle 38, the bearing assembly 46 and carrier 42 are examples of components that serve the various roles of forcing a reaction, secondarily being secured as a result of the reaction, and reacting to the force, respectively.

Through the examples described above, an assembled product includes a first component, in the form of a carrier in the described example. A second component, in the form of a bearing in the described example, is configured to mate with the first component and is removable from the first component for a positional adjustment. A third component, in the form of a spindle in the described example, is configured to mate with the first component and to be engaged therewith by a first interference fit. The first interference fit is configured to impart a resultant reaction in the first component that creates a second interference fit between the first and second components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An assembled product comprising:
   a first component;
   a second component configured to mate with the first component and to be removable from the first component for a positional adjustment; and
   a third component configured to mate with the first component and to be engaged therewith by a first interference fit, wherein the first interference fit is configured to impart a resultant reaction in the first component that creates a second interference fit between the first and second components;
   wherein the first component defines an opening, the second component is disposed around the first component, and the third component is a spindle received in the opening to impart the resultant reaction toward the second component.

2. The product of claim 1 comprising a fourth component located at a defined positional setting relative to the second component, wherein the positional adjustment is configured to achieve the defined positional setting.

3. The product of claim 2 comprising a shim configured to provide the positional adjustment.

4. The product of claim 2 wherein the second and fourth components are configured to be preloaded as a result of the defined positional setting.

5. The product of claim 2 wherein the second and fourth components are configured with a clearance between each other as a result of the defined positional setting.

6. The product of claim 5 wherein the second and fourth components each comprise a bearing.

7. The product of claim 1 wherein the first, second and third components are configured to not rotate.

8. A method of assembling multiple components comprising:
   mating a first component configured as an opening with a second component so that the second component is around the first component and removable from the first component;
   inserting a third component configured as a spindle in the opening of the first component;
   engaging the first and third components together by a first interference fit;
   imparting, by the first interference fit, a resultant reaction in the first component creating a second interference fit between the first and second components and imparting the resultant reaction toward the second component.

9. The method of claim 8 comprising:
   locating a fourth component at a defined positional setting relative to the second component; and
   making a positional adjustment of the second component to achieve the defined positional setting prior to engaging the first and third components together.

10. The method of claim 9 comprising shimming the second component to make the positional adjustment.

11. The method of claim 9 comprising preloading, as a result of the defined positional setting, the second and fourth components.

12. The method of claim 9 comprising providing, as a result of the defined positional setting, a clearance between the second and fourth components.

13. The method of claim 12 comprising configuring the second and fourth components as bearings.

14. The method of claim 8 comprising assembling the first, second and third components to not rotate.

15. A method of assembling multiple components comprising:
   mating a first component with a second component so that the second component is removable from the first component;
   measuring a position of the second component;
   removing, when the measured position is not within a defined positional setting, the second component from the first component;
   adjusting the position of the second component;
   mating a third component with the first component;
   engaging the first and third components together by a first interference fit; and
   imparting, by the first interference fit a resultant reaction in the first component creating a second interference fit between the first and second components;
   wherein mating the first component with the second component comprises sliding a first bearing as the second component onto a carrier as the first component;
   wherein measuring the position of the second component comprises measuring the position of the first bearing relative to a second bearing; and
   wherein mating the third component with the first component comprises pressing a spindle as the third component into an opening in the carrier, wherein the carrier expands in reaction to pressing the spindle into the opening, forcing the carrier against the first bearing creating the second interference fit.

16. The method of claim 15 wherein adjusting the position of the second component comprises shimming the second component.

* * * * *